United States Patent
Schmitz et al.

(10) Patent No.: US 6,328,312 B1
(45) Date of Patent: Dec. 11, 2001

(54) SHAFT SEAL ASSEMBLY

(75) Inventors: Rolf Schmitz, Wiesbaden; Jochen Busch, Geisenheim-Johannisberg, both of (DE)

(73) Assignee: Interseal Dipl. -Ing. Rolf Schmitz GmbH (DE)

( * ) Notice: Subject to any disclaimer, the term of this patent is extended or adjusted under 35 U.S.C. 154(b) by 0 days.

(21) Appl. No.: 09/535,073

(22) Filed: Mar. 23, 2000

(30) Foreign Application Priority Data

Mar. 26, 1999 (DE) .............................................. 199 13 821

(51) Int. Cl.$^7$ .............................. F16J 15/18; F16C 33/80
(52) U.S. Cl. ......................... 277/520; 277/916; 384/484; 384/486
(58) Field of Search .................................. 277/500, 510, 277/511, 520, 549, 551, 562, 563, 565, 572, 573, 577, 576, 916; 384/484, 486, 489, 152, 147, 148

(56) References Cited

U.S. PATENT DOCUMENTS

| | | |
|---|---|---|
| 3,301,613 | 1/1967 | DeClaire . |
| 4,795,128 * | 1/1989 | Kransnov et al. . |
| 4,971,457 * | 11/1990 | Carlson . |
| 5,178,400 * | 1/1993 | Singh . |
| 5,197,807 * | 3/1993 | Kuznar . |
| 5,347,801 * | 9/1994 | McIlwain . |
| 5,577,847 * | 11/1996 | Nakamura et al. . |

FOREIGN PATENT DOCUMENTS

| | | | |
|---|---|---|---|
| 28 35 337 A1 | 8/1978 | (DE) | ................................ F16C/35/04 |
| 44 44 719 A1 | 12/1994 | (DE) | ................................ F16C/33/72 |
| 195 35 549 A1 | 9/1995 | (DE) | ................................ F16C/33/72 |
| 0 268 730 A2 | 5/1987 | (EP) | ................................ F16J/15/06 |

* cited by examiner

Primary Examiner—Anthony Knight
Assistant Examiner—Vishal Patel

(57) ABSTRACT

Shaft seal for sealing between a shaft (2) and a machine housing (3). A seal and bearing casing (10) surrounds the shaft (2) to be sealed off and contains a rolling-contact bearing device (11) and a row of lip seals (13), the sealing lips of which engage the shaft surface (2) or a shaft protection sleeve (12). A compensation device (14) is connected, an the one hand, in a sealing manner to the casing (10) by means of a radially inner annular fastening part (23), and is connected, an the other band, in a sealing manner to the housing (3) by means of a radially outer annular fastening part (25), and has a flexible bridging portion (24) between the annular fastening parts (23, 25). The bridging portion (24) contains a first and a second elastomer ring seal (24*a*, 24*b*), which are arranged at an axial distance from one another in respective seat recesses (26, 27, 28) of the casing (10) and of the compensation device (14).

8 Claims, 2 Drawing Sheets

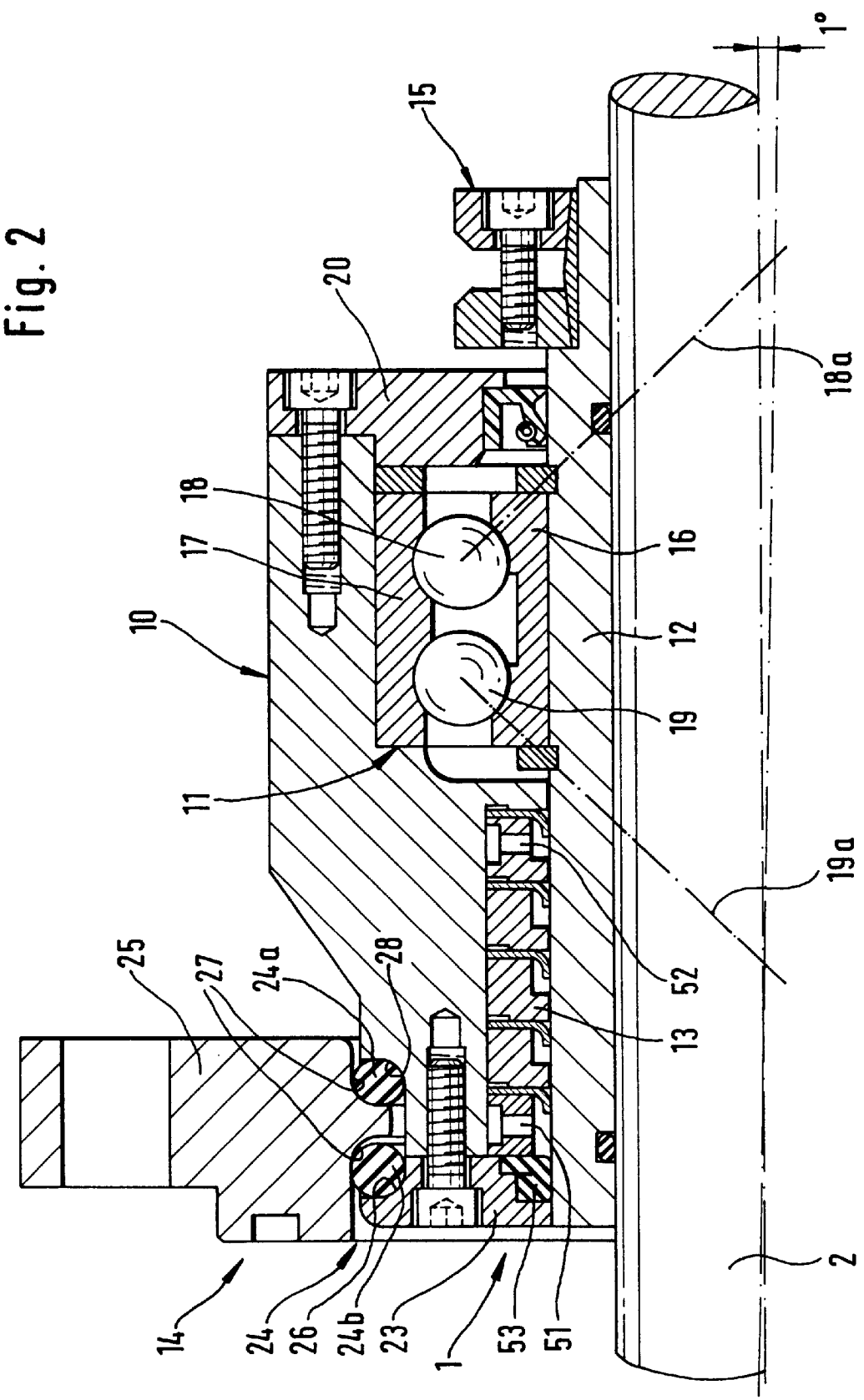

SHAFT SEAL ASSEMBLY

FIELD OF THE INVENTION

The invention relates generally to a shaft seal assembly for sealing between a shaft and a machine housing and particularly to a shaft seal assembly comprising a casing for lip seal devices which follow any thermal or mechanical deformation of the shaft by virtue of ball bearings.

BACKGROUND OF THE INVENTION

A shaft seal assembly of this kind is known from DE 195 32 549 A1 and has a compensating device with a bridging portion made up of an elastomer which connects annular fastening members to one another with a certain flexibility and forms a bridge between the machine housing and the bearing casing. This elastomer bridging portion is a shaped part which has to be produced specifically for the shaft seal.

In the case of another known shaft seal assembly of the type refereed-to-above DE 44 44 719 A1, the compensation device or its bridging portion comprises a metal bellows or compensator. A device of this kind is expensive and requires large dead spaces in the region of the shaft exit from the machine housing.

A further shaft seal assembly is known (EP 0 268 730 A2) wherein a counter-ring for a sliding ring seal to which lubricant is supplied, is held by a radially inner annular collar and a radially outer holding flange. These members are provided with seat recesses for O-rings. These O-rings are fixed by an annular disk and another O-ring. The O-rings serve to seal off the lubricant supply. The sliding ring seal and the counter-ring formed by the inner annular collar rest against one another in the axial direction.

A further shaft seal assembly is known (U.S. Pat. No. 3,301,613) wherein a lubricated sliding-contact bearing uses an outer annular thrust bearing to supply lubricant, and sealing off the lubricant passage is by means of O-rings, via which bearing forces are also passed. A graphite ring is used to seal off the lubricant from conveyed material.

SUMMARY OF THE INVENTION

An object of the invention is to propose a shaft seal assembly of the type referred-to above comprising a compensation device and a bridging portion which can be constructed from inexpensive commercially available components. A further object of the invention is to largely avoid dead spaces in which material to be sealed off could collect.

With the invention, the shaft seal assembly has a compensating device and a bridging portion which seal any gap between machine housing and bearing casing yet allowing compensating movements between housing and casing.

More specifically, the bridging portion comprises two elastomer ring seals which are arranged at an axial distance from one another and allow mobility in one or the other direction by virtue of their elastic deformation and to the extent of this deformation.

BRIEF DESCRIPTION OF THE DRAWINGS

The invention is described with reference to the drawing, in which:

FIG. 2 shows a shaft seal for a stirrer.

FIG. 1 shows a longitudinal section through the edge of a shaft seal in the region of a gap 1 between a shaft 2 and a machine housing 3. A casing 10 for a seal and bearing, a rolling bearing device 11, a shaft protection sleeve 12, a row of lip seals 13 and a compensating device 14 are provided. The shaft protection sleeve 12 has a cylindrical coated surface for engagement of the lip seals and is connected to the shaft 2 in a statically sealed manner and, for this purpose, can be tightened an the shaft 2 by means of a clamping-wedge device 15 (FIG. 2). The purpose of the shaft protection sleeve 12 is to allow the shaft seal to be constructed as a cartridge which is mounted as a complete constructional unit an the shaft 2. The lip seals 13 can be installed accurately in this constructional unit without being subject to the restrictions in terms of location imposed by the shaft 2 or the housing 3, and the material and machining of the shaft protection sleeve 12 can be matched to the lip seals 13.

Figure 1:
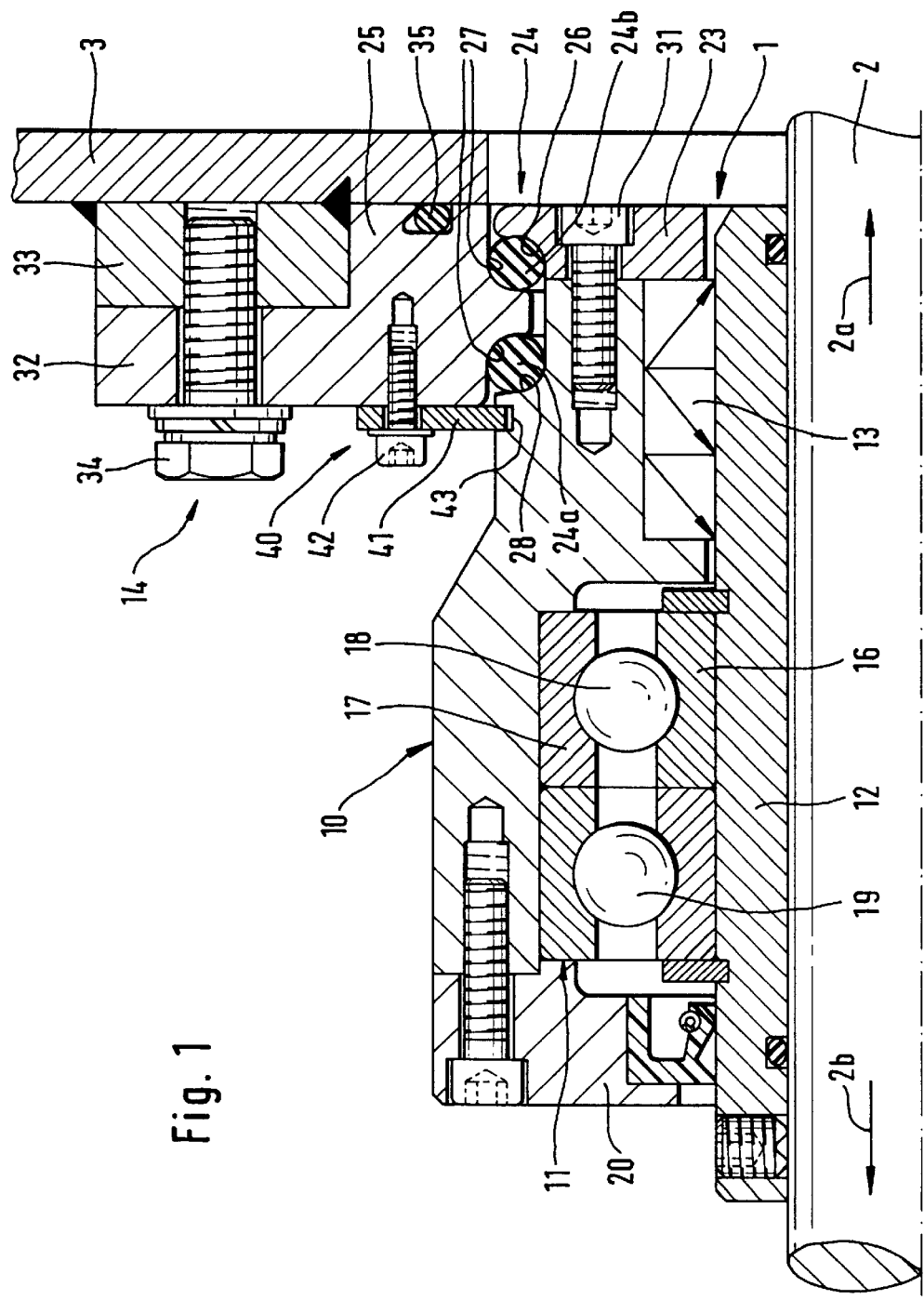
FIG. 1 shows a first embodiment of a shaft seal in longitudinal section.

The purpose of the rolling-bearing device 11 is to carry the casing 10, for guiding same to follow the movements of the shaft 2—apart a from its rotation, —the device comprises inner races 16, outer races 17 and two ball-bearing rows 18 and 19 which ensure virtually backlash-free support and, for this purpose, are held by means of spring rings and the shaft protection sleeve 12 and in an annular recess in the bearing housing 10 by means of a bearing cap 20. The j seal and bearing casing 10 thus follows all the thermal movements and flexing of the shaft 2, thus ensuring that the distance between the outer surface of 10 the sleeve 12 and the inside of the seal and bearing housing 10 remains constant. The lip seals 13 can thus operate under optimum conditions, i.e. there are no shocks and the lip seals during the rotation of the shaft 2 and the shaft protection sleeve 12 to impair 15 its sealing capability.

The compensation device 14 has the function of allowing the bearing casing 10 to follow the movements and thermal changes in the shaft 2 and, at the same time, to seal off the interior of the housing 3 from 20 the outside of the housing. For this purpose, the compensation device 14 comprises a radially inner annular fastening part 23, a flexible bridging portion 24 and a radially outer annular fastening part 25.

The bridging portion 24 comprises two elastomer ring seals 24a, 24b of a commercially available type with a circular cross section. The inner annular disk 23 has a peripheral corner recess or fillet 23 in the form of a quarter circle an its radial edge, adjacent to the fastening part 25, which likewise has peripheral fillets 27 of this type in the form of quarter circles which face toward the inside and the outside of the machine housing 3 in the axial direction. A similar peripheral fillet 28 in the form of a quarter circle is also provided and the seal and bearing casing 10, the fillets 26 and 28 lying opposite one another in the axial direction. The fillets 26, 27, 28 thus form seat recesses to accommodate the ring seals 24a, 24b, which are seated with a certain prestress in the fillets 26 to 28. If the shaft 2 is moved in the direction of the arrow 2a relative to the machine housing 3, ring seal 24a is compressed and ring seal 24b is relieved of load. Conversely, if the shaft is moved in the direction of the arrow 2b, ring seal 24b is subjected to load and ring seal 24a relieved of load. If the shaft 2 flexes, tilting movements of the bearing casing 10 occur, and the ring seals 24a, 24b are subjected to load an one side and relieved of load an the other side.

To allow smooth-walled fastening of the inner annular disk 23 to the seal and bearing casing 10, countersunk screws 31 covered by caps are provided. The outer annular disk 25 has a radially outer flange 32, which is fastened to an annular web 33 of the machine housing 3 by a ring of screws 34. A ring seal 35 ensures sealing between the outer fastening ring 25 and the machine housing 3.

To protect the seals 24a, 24b during transport, and to facilitate installation of the shaft seal, an assembly aid 40 in the form of three tabs 41 distributed around the circumference of the outer fastening part 25 is provided, these being fastened pivotably by means of screws 42 and interacting with the groove 43 in the bearing casing 10. When the tabs 41 engage in the groove 43, as illustrated, the bearing casing is fixed relative to the fastening part 25. This position is assumed during transport and during the installation of the shaft seal. After assembly, the tabs 41 are pivoted out of the groove 43 and are held in this pivoted-out position by tightening the screw 42.

FIG. 2 shows a longitudinal section through the edge of a stirrer seal. Similar parts are given the same reference numerals as before. Instead of two balls bearings, the rolling-contact bearing device 11 can comprise a shoulder-type ball bearing. In this, the support locations are formed by two balls, whose points of contact face away from one another, as indicated by the lines 18a, 19a. A shoulder-type ball bearing of this kind allows flexing of the shaft 2 by 1°, as illustrated, without impairing the running of the balls.

The embodiment in accordance with FIG. 2 furthermore comprises a gas barrier chamber 51 and a leakage control chamber 52. The bearing casing 10 comprises passages (not shown) which lead to these chambers 51 and 52. By introducing pressurized gas into the chamber 51, a leak can be sealed off when detected by a sensor in the leakage monitoring chamber 52. As FIG. 2 shows, the annular fastening part 23 can furthermore accommodate a flexible scraper ring 53. With the shaft seal, it is possible to seal off pressures of 10 to 25 bar and, with special designs, even higher pressures. The shaft seal is distinguished by the fact that there is virtually no dead space in the vicinity of the gap 1 to be sealed off. This is desirable in many applications because of the possibilities for cleaning.

What is claimed is:

1. A shaft seal assemble for sealing between a, shaft and a machine housing comprising the shaft carrying a rotational symmetrical surface which undergoes changes due to flexing or thermal expansion of the shaft, a casing which surrounds the shaft to be sealed off and, at an axial distance from one another, has a rolling-contact bearing device and a row of lip seals, the row of lips seals thereof engaging said rotationally symmetrical surface;

a compensation device including a radially inner annular fastening member, a radially outer annular fastening member, and a flexible bridging, the compensation device being connected, on the one hand, in a sealing manner to said casing by means of said radially inner annular fastening member and being connected, on the other hand, in a sealing manner to said machine housing by means of said radially outer annular fastening members said flexible bridging being arranged between said radially inner and outer fastening members to allow the row of lip seals and bearing casing to follow the flexing and thermal expansion of the shaft, wherein at an axial distance from said rolling-contact bearing device, said casing and the radially inner annular fastening member each have radially outer seat recesses, and the radially outer annular fastening member has radially inner seat recesses, and wherein said flexible bridging contains a first and a second elastomer ring seal, which are arranged at an axial distance from one another, each in a respective one of said seat recesses of said casing and of the radially inner and outer fastening members, in order on the one hand to seal off said interior space of the machine housing and on the other hand, to allow said casing limited mobility relative to the machine housing, as necessitated by the shaft.

2. The shaft seal assembly as claimed in claim 1, wherein the elastomer ring seals each have a circular cross section, wherein the radially inner seat recesses, each with a cross section in the form of a quarter circle, are provided between said casing and the outer annular fastening member to accommodate said first ring seal, and wherein further the radially outer seat recesses with a cross section in the form of a quarter circle are provided between the inner annular fastening member and the outer annular fastening member to accommodate the second ring seal.

3. The shaft seal assembly claimed in claim 1, wherein said inner annular fastening member is arranged so as to fix said row of lip seals.

4. The shaft seal assembly as claimed in claim 3, wherein said inner annular fastening member comprises a flexible scraper ring on its inner radius.

5. The shaft seal assembly as claimed in claim 1, wherein a barrier-gas chamber is included in said row of lip seals.

6. The shaft seal assembly as claimed in claim 1, wherein a leakage-monitoring chamber is included in said row of lip seals.

7. The shaft seal assembly as claimed in claim 1, wherein said outer annular fastening member has an outer fastening flange to be fastened to an annular web of said machine housing.

8. The shaft seal assembly as claimed in claim 1, wherein said casing has a plurality of grooves and said outer annular fastening member has a plurality of hinged tabs, said plurality of tabs when engaging in said plurality of grooves ensuring that said casing and said outer annular fastening member are held together during assembling the shaft seal assembly.

* * * * *